July 28, 1964

R. B. BASHAM 3,142,757

COINCIDENT PULSE SUPPRESSION SYSTEM FOR SIMULTANEOUS
RADIOACTIVITY WELL LOGGING

Filed April 8, 1960

INVENTOR.
Raymond B. Basham
BY Wm. T. Wofford
Attorney 3,142,757
COINCIDENT PULSE SUPPRESSION SYSTEM FOR SIMULTANEOUS RADIOACTIVITY WELL LOGGING
Raymond B. Basham, Fort Worth, Tex., assignor to The Western Company, Fort Worth, Tex.
Filed Apr. 8, 1960, Ser. No. 20,976
8 Claims. (Cl. 250—83.3)

This invention pertains to logging systems, and especially to such systems as employed for the making of simultaneous logs of different kinds of radioactivity in a well, well bore or the like.

It is common practice in the petroleum exploration industry to run simultaneous surveys of the radioactivity present at various depths in a well or well bore or like subterranean channel. By "simultaneous" is here meant the making of two or more records of different radioactive effects, at the different levels in a hole, and either correlated as to time or depth or made upon a single record medium so that both phenomena can be continuously related to identical formation levels. For example, it is common practice to run a simultaneous log of neutron and gamma-ray activity during a single one-way transit of the survey equipment through the hole.

It is a principal object of the present invention to provide a system for use in the making of such simultaneous logs, which will improve the accuracy of the registration or recording of the data as compared with known logging systems of this type; and without any substantial complication of the apparatus or techniques required. More specifically, the invention provides an arrangement by which the accuracy of pulse counts of neutron and gamma-ray activity as transmitted to the above-ground equipment will be improved, by reducing the loss of counts which is normally entitled by existing single-channel equipment used in making such surveys.

The utility of the foregoing improvement will be better understood by considering the common prior art practice of making simultaneous surveys of the kind mentioned. For equipment economy, as well as to ensure accurate depth-correlation between the neutron and gamma-ray data, a single coaxial conductor is used to convey the pulse count information from the subsurface detecting equipment to the surface. Pulses of one polarity are transmitted over this cable to designate neutron counts, while pulses of the opposite polarity are transmitted to designate gamma-ray counts. These two kinds of data transmission pulses are separately recorded at the surface, though usually upon a common medium for ease in correlation. However, it is a known fact that there will ordinarily be many more of one kind of pulses than of the other kind; specifically, in the case of neutrons and gamma-rays, there will always be very considerably more neutron pulses than gamma-ray pulses. Since both kinds of pulses have a finite duration, it follows that pulses of both kinds will occasionally occur simultaneously, or will so nearly overlap that, being of opposite polarity, their combined effect at the far end of the channel will be zero. When this happens, one pulse of each kind will be lost, and the log will be in error to that extent.

As it affects the recording of the phenomenon which produces the larger number of pulses (the neutron data, in the present example), the error may be tolerable or immaterial, but it is obvious that, on a percentage comparison, a much larger error will result in the recording as to the other phenomenon.

It is accordingly a specific object of the present invention to provide a system of the above type in which, in the event of a time-coincidence of two pulses of opposite kind that would ordinarily involve the loss of both pieces of information, only a pulse of one such kind will be lost; and more particularly, only a pulse of that kind which is numerically superior, so that the percent error in the relative frequency of pulse occurrence will be kept at a minimum.

Briefly summarizing, the invention, in accordance with a preferred embodiment, provides a system having a single physical transmission circuit such as a coaxial cable over which it is desired to transmit pulse count information between two subsurface detectors and an above-ground recorder; the system including for example two separate pulse-producing signalling devices operative to apply pulses of opposite polarity to the circuit upon the respective occurrence of neutron and gamma-ray events at the detectors. In such a system, the invention provides a blocking connection from a selected one of such signalling devices to the other, such that under conditions of pulse coincidence that would otherwise produce loss of both signals, priority is assigned to the pulse of the selected kind and it is transmitted without cancelation by the suppressed pulse of the non-selected kind.

A preferred embodiment of the invention will now be described in detail, by way of example and so that those skilled in the art can readily practice the same, but without intending thereby to limit the scope of the invention itself, which is defined in the appended claims.

Reference is made to the accompanying drawings, in which.

Figure 1:
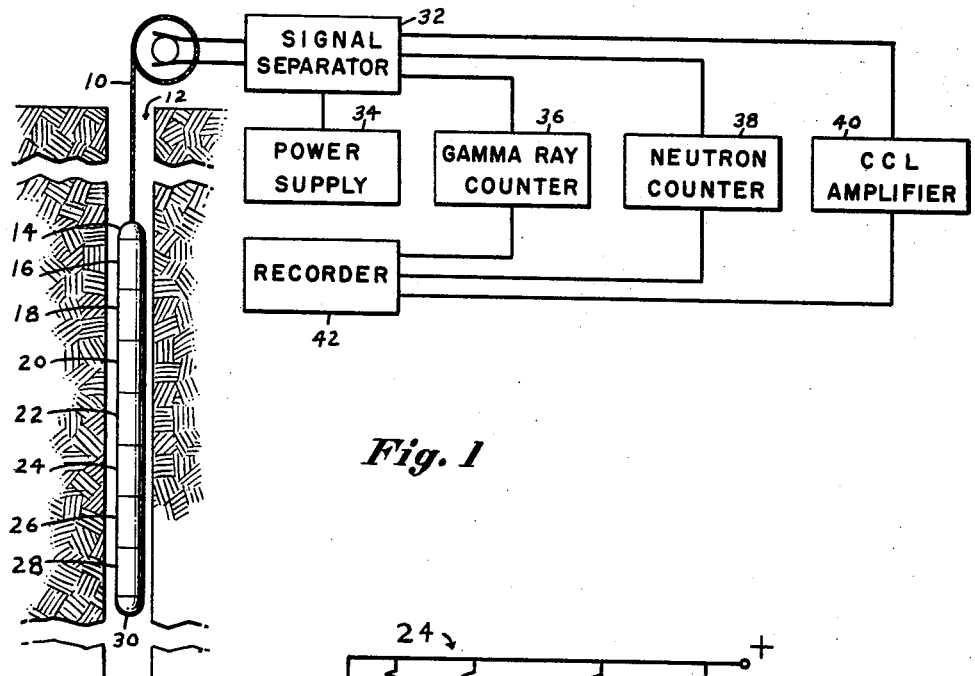
FIGURE 1 is a schematic illustration, largely in block form, showing the relative arrangement of the parts in use for well logging operations.

As best shown in FIGURE 1, the survey equipment itself is of generally conventional form suspended by a cable 10 for raising and lowering the same into and out of a well bore 12. Such cable will include, or will have associated therewith, a single physical channel, usually a coaxial cable, for conveying the electrical pulse signals indicative of both neutron and gamma-ray counts, in a manner to be described. The down-hole equipment will typically be in the form of a torpedo including, from the top down, a cable-securing headpiece 14, a section 16 containing the electronic amplifier and output stages for a gamma-ray detector, a section 18 containing the gamma-ray detector itself, a section 20 containing a high voltage power supply for gamma-ray and neutron detectors, optionally a casing collar locating section 22, usually including its own detector and amplifier components, a section 24 containing amplifier and output stages for the neutron detecting equipment, a section 26 containing the neutron detector, a section 28 in which is contained the neutron source, and a terminal nosepiece 30.

The foregoing components or sections are individually encased in lengths of heavy pipe or tubing, usually threaded for interconnection into the single torpedo-shaped unit as shown. However, it will be understood that the particular components described may be varied, both as to selection and arrangement, depending upon the particular kind of log which is to be run. Suitable electrical interconnections, including plugs and sockets and the like, will be provided as well understood by those skilled in this art.

Similarly, FIGURE 1 also shows schematically a typical combination of ground-level signal receiving and processing equipments, connected to the down-hole torpedo as already described. These equipments may thus include a signal separator 32 for multiplexed signals, a power supply unit 34, a gamma-ray pulse count meter 36, a neutron counting rate meter 38, a casing-collar locator amplifier 40, and a plural-channel recorder 42. Suitable interconnections, as obvious to those skilled in the art, are indicated but are not detailed herein, and the internal construction and operation details of the components are likewise omitted, suitable information thereon being widely available.

Figure 2:
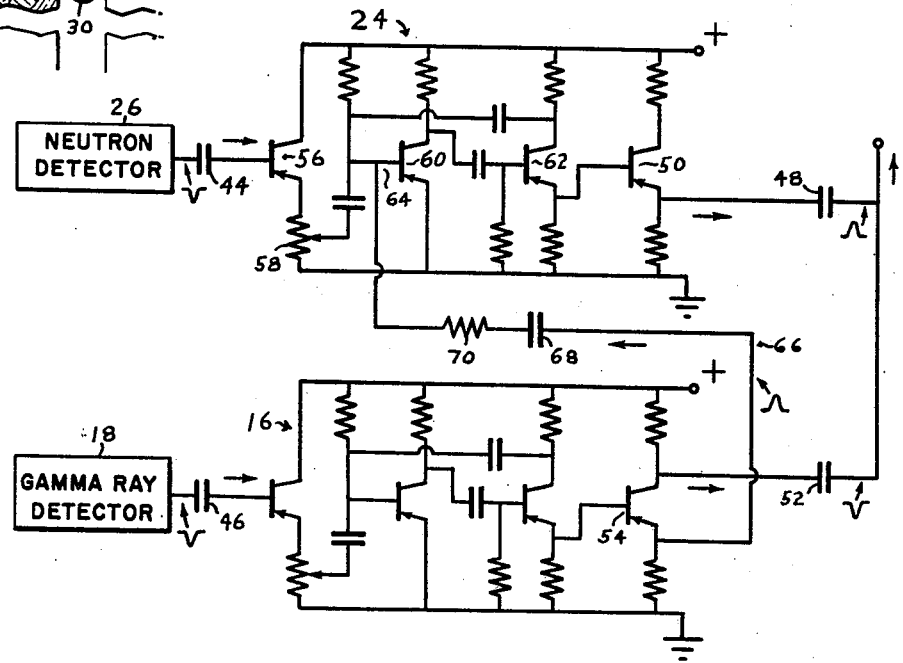
FIGURE 2 is a schematic wiring diagram giving specific illustrative circuitry for the pulse producing devices and the priority interconnection.

Turning now to FIGURE 2 of the drawings, the electrical circuits for the neutron pulse transmitting amplifier 24 and the gamma-ray pulse transmitting amplifier 16 are shown in detail, together with the interconnecting control means forming the actual subject-matter of this invention. Both of the neutron detector 26 and the gamma-ray detector 18 inherently produce negative-going pulses with respect to their power supply, and these pulse outputs are coupled to the respective amplifiers by suitable coupling capacitors 44 and 46, as shown. The respective transmitting amplifiers operate to amplify these pulses, bring them to a standard level suitable for transmission to the above-ground equipment, and in one case to invert the polarity of the transmitted pulse to permit the two kinds of pulses to be readily distinguished by the separator 32.

In the example shown, the pulses transmitted by amplifier 24 are inverted to positive-going polarity for transmission, here shown as being accomplished by connecting its output coupling capacitor 48 to the emitter of the output transistor 50, whereas the output coupling capacitor 52 of the gamma-ray amplifier 16 is connected to the collector electrode of its output transistor 54. The desired polarity inversion can readily be accomplished in a variety of other ways, as by the use of complementary type output transistors, power-supply inversion, a separate polarity-inverting stage, and like expedients as will occur to those familiar with such circuits.

In the example shown, simplicity is obtained by using duplicate amplifiers each including four transistors of the same type; only one of these has to be described in detail. Thus, taking the unit 24 as a typical of both, it includes an emitter-follower pre-amplifier stage including transistor 56 and gain control 58, connected to control a univibrator (one-shot multivibrator) consisting of interconnected transistors 60 and 62, and a buffer output-amplifier stage including the transistor 50. In the case of both of units 24 and 16, receipt of a negative input pulse produces a single standardized output pulse of equal amplitude, but of opposite polarity in view of the output connections already described. Since each of the univibrators is designed to operate when supplied with a negative-going input pulse, it follows that either such univibrator can be blocked by applying to its input (as at 64) a positive-going blocking pulse of no smaller amplitude.

Since it is the purpose of the invention to block the positive output pulse from unit 24 when (and only when) there is time-coincidence between the events sensed by detectors 26 and 18, use is made of the positive-going output pulse available at the emitter electrode of transistor 54 for this purpose. The connecting circuit is indicated at 66 leading from the emitter of transistor 54 through coupling capacitor 68 and current-limiting resistor 70 (to avoid prolonged paralysis or blocking of the univibrator of 24) and thence to point 64 at the base electrode of transistor 60. Thus, both amplifiers are continuously operative to transmit pulses of their respective output polarities in the above-ground equipment, but in the event of a time-coincidence which would entail mutual cancelation of the outputs, the positive pulse from the neutron detector amplifier 24 is blocked, and only the negative output pulse from amplifier 16 is transmitted. In this way, priority is assigned to the relatively less-frequent gamma-ray pulses in the event of coincidence. There are other types of connecting circuits that could be effectively used, as for example, a transistor having its emitter grounded, its collector connected to point 64, and its base connected through a resistance to the base of transistor 54.

The internal construction of the amplifiers 16 and 24 is conventional and hence will not be detailed herein; moreover, it will be apparent to those familiar with such circuits that other types of amplifiers and univibrators can be employed, and that they need not be duplicates of one another. For purposes of reference, a detailed description of the two-transistor univibrator shown herein can be found in U.S. Patent 2,641,717 to Toth. A single-transistor version of an equivalent is described in U.S. Patent 2,644,895 to Lo, and the prior art affords many examples of alternative components suited for use in the novel combination described herein.

It is therefore to be understood that the specific circuitry shown above is given by way of example, and that the invention itself is not to be limited to such details, except as may be required by the scope of the appended claims.

What is claimed is:

1. In a simultaneous radioactivity bore hole logging operation apparatus for neutron and gamma-ray bore hole measurements, a single physical circuit for extension to above ground recording equipment, individual means for sensing neutron and gamma-ray events, respective pulse-forming devices connected to said individual means for transmitting pulses of opposite polarity over said circuit upon occurrence of such events, and means interconnecting said devices for suppressing the pulse output of one and only one of said devices during the output-producing operation of the other, whereby pulses of only one specified polarity are lost upon the occurrence of two such events in time coincidence.

2. Bore hole apparatus in accordance with claim 1, in which the device whose output is selectively suppressed is that one connected to the neutron sensing means.

3. Bore hole logging apparatus in accordance with claim 1, in which each of said pulse-forming devices includes a triggered univibrator, and in which said interconnecting means includes a connection from the output of one univibrator to the input of the other.

4. Bore hole logging apparatus in accordance with claim 3, in which said univibrators comprise cross-connected transistors.

5. In a bore hole logging system having a single physical channel and separate devices at one end of said channel for impressing thereon independent series of electrical impulses distinguished by opposite polarity, and corresponding to the relative occurrence of two respective kinds of events, and means at the other end of said channel for counting impulses of both polarities, whereby time-coincidence of both kinds of events effects cancellation of two opposite pulses and loss of both counts, the improvement which comprises means interconnecting said devices for suppressing the output of one and only one of said devices during the output-producing operation of the other, whereby impulses of only one specified polarity are lost upon the occurrence of time coincidence of events of said two kinds.

6. A bore hole logging system in accordance with claim 5, in which one of said kinds of events occurs much more frequently than the other, and in which said interconnecting means suppresses the output of only that device corresponding to the more frequent kind of event.

7. A bore hole logging system in accordance with claim 5, in which devices are pulse generators triggered by the respective events, and in which said interconnecting means blocks the operation of one of said devices in response to output from the other.

8. Bore hole logging equipment including a pair of input signal conductors and separate pulse output producers connected to said conductors for producing pulses of respective polarities on a common transmission line to represent respective input signals on said conductors, and means controlled by signals on one of said conductors for blocking the output of the pulse producer connected to the other conductor upon the simultaneous occurrence of input signals on both said conductors.

References Cited in the file of this patent
UNITED STATES PATENTS

| | | |
|---|---|---|
| 2,298,794 | Howell | Oct. 13, 1942 |
| 2,830,188 | Scherbatskoy | Apr. 8, 1958 |
| 2,911,536 | Scherbatskoy | Nov. 3, 1959 |
| 2,998,521 | Rankin | Aug. 29, 1961 |
| 3,008,045 | Ruderman | Nov. 7, 1961 |